United States Patent [19]

Komatsu et al.

[11] Patent Number: 4,962,521
[45] Date of Patent: Oct. 9, 1990

[54] APPARATUS FOR STILL PICTURE VIDEO TELEPHONE APPARATUS AND METHODS FOR TRANSMITTING AND DISPLAYING STILL PICTURE IMAGE FOR USE THEREIN

[75] Inventors: Fumiaki Komatsu; Junichi Sakamoto; Hitoshi Fujimoto; Hiroshi Ohtsuka; Kazuyuki Saigusa; Akifumi Kabasawa, all of Kanagawa; Shinya Yokodate, Gumma; Kenichi Kashiwagi, Kanagawa, all of Japan

[73] Assignee: Mitsubishi Denki Kabushiki Kaisha, Japan

[21] Appl. No.: 285,816

[22] Filed: Dec. 16, 1988

[30] Foreign Application Priority Data

Dec. 17, 1987 [JP] Japan .................................. 62-319725
Apr. 22, 1988 [JP] Japan .................................. 63-99804
Apr. 22, 1988 [JP] Japan .................................. 63-99805
Apr. 22, 1988 [JP] Japan .................................. 63-99806

[51] Int. Cl.[5] ...................... H04M 11/00; H04N 7/14
[52] U.S. Cl. .......................................... 379/53; 379/96; 379/100; 358/85; 358/453
[58] Field of Search ...................... 379/53, 54, 96, 100; 358/85, 134, 257, 400, 451, 453

[56] References Cited

U.S. PATENT DOCUMENTS 4,258,387  3/1981  Lemelson et al. .................. 379/53
4,291,198  9/1981  Anderson et al. .................. 379/96
4,485,400  11/1984 Lemelson et al. .................. 379/53
4,715,059  12/1987 Cooper-Hart et al. ............. 379/53
4,739,413  4/1988  Meyer ................................ 358/281

FOREIGN PATENT DOCUMENTS 0050611  4/1977  Japan ................................ 358/85
0142986  6/1988  Japan .
0263982  10/1988 Japan ................................ 379/53

Primary Examiner—Jin F. Ng
Assistant Examiner—Wing F. Chan
Attorney, Agent, or Firm—Bernard, Rothwell & Brown

[57] ABSTRACT

A still picture video telephone apparatus adapted to transmit and receive, through a telephone line, still picture information from a television camera or the like, during a telephone call, includes a picture memory for storing a plurality of pages of picture information consisting of a camera-taken picture memory portion which rewrites still picture information input therein delivered from the television camera at intervals of a predetermined period, a self-prepared picture memory portion which stores desired still picture information until arrival of a rewrite instruction, and an incoming picture memory portion which sequentially rewrites still picture information therein upon receipt of still picture information when its storage regions are filled up, memory region input information for setting up regions for the self-prepared picture memory portion and the incoming picture memory portion within the picture memory, and picture memory control circuit for controlling still picture information input to and output from the picture memory based on the memory region information, wherein the picture memory is capable of storing a plurality pages of still picture information and allocating memory regions to the self-prepared picture memory portion and the incoming picture memory portion in various ways.

10 Claims, 15 Drawing Sheets

FIG. 9
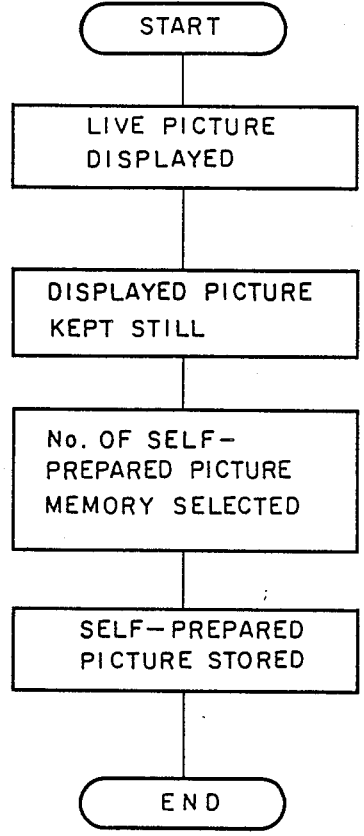
FIG. 5
(PRIOR ART)
(A)
(B)
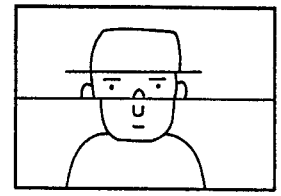
(C)
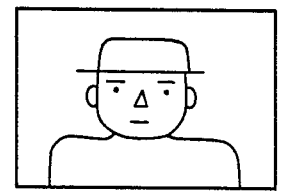

FIG. 6 (A) (PRIOR ART)
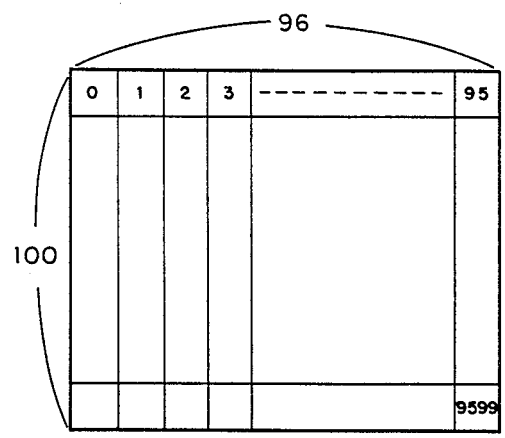
FIG. 6 (B) (PRIOR ART)
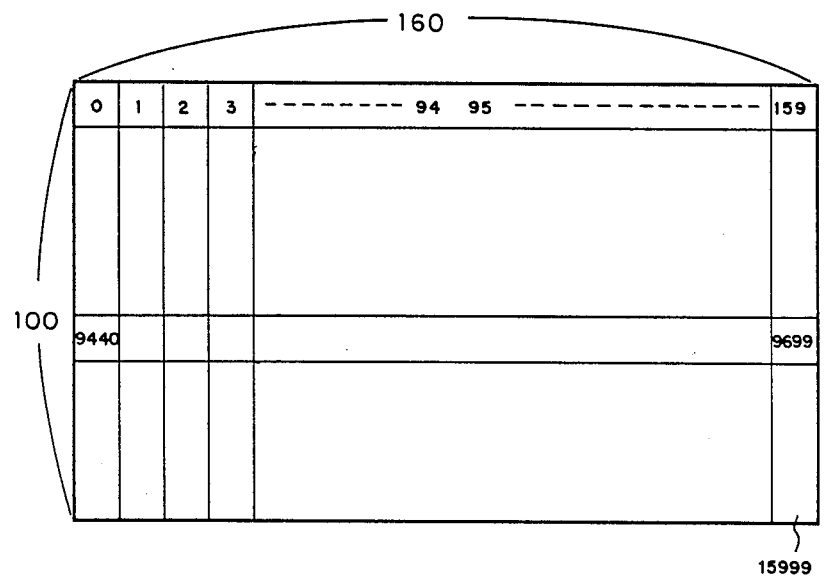

FIG. 14
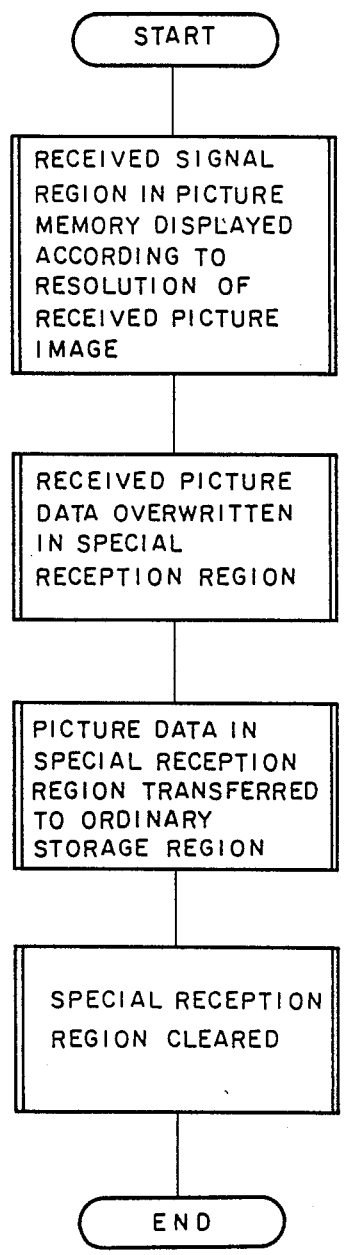
FIG. 16
(A)
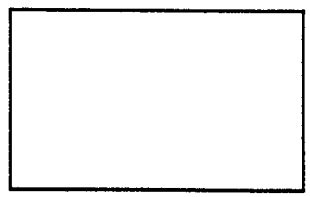
(B)
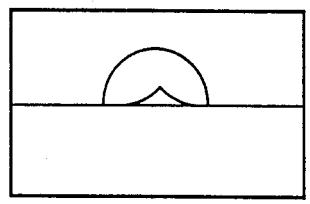
(C)
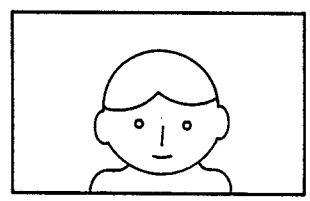

APPARATUS FOR STILL PICTURE VIDEO TELEPHONE APPARATUS AND METHODS FOR TRANSMITTING AND DISPLAYING STILL PICTURE IMAGE FOR USE THEREIN

BACKGROUND OF THE INVENTION

1. Field of the Invention

The present invention relates to apparatus for still picture video telephone and methods for transmitting and displaying still picture image for use therein.

2. Description of the Prior Art

There are demands for a video telephone system capable of simultaneously transmitting audio and video information through a telecommunication line. By the use of the telecommunication line today, however, it is difficult to continuously transmit and receive a moving picture because it requires huge amounts of data. Hence, at present, a still picture video telephone system which transmits a still picture image during a telephone call is being put into practical use.

The still picture video telephone is a system capable, in the course of a telephone conversation with an ordinary voice signal, of temporarily stopping the conversation and transmitting, in the meantime, a desired still picture, such as the face of the speaker, photo, picture, and drawing relative to the contents of the conversation.

According to such a still picture video telephone system, it is made possible to transmit and receive a picture image through a telephone line, which in the past was impossible, and the processed data quantity is not so large because only a single still picture is transmitted at a time, and therefore, there has been an advantage that the video telephone system can be easily put into practical use.

Such a video telephone system capable of transmitting a still picture is disclosed, for example, in "Overseas Telecommunications Technology", October 1986. FIG. 1 is a circuit configuration diagram of the simplified still picture video telephone apparatus disclosed therein. Referring to the drawing, reference numeral 1 denotes a hand set, 2 denotes a microphone, 3 denotes a voice input/output circuit, 4 denotes an analog circuit, 5 denotes a matrix switch, 6 denotes a telephone interface circuit, 7 denotes a telephone line connection terminal, 8 denotes a speaker, 9 denotes a key pad, 10 denotes an input/output port, 11 denotes a CPU, 12 denotes a program memory, 13 denotes a modulator/demodulator circuit, 14 denotes a television camera, 15 denotes an image controller, 16 denotes a picture memory, and 17 denotes a display.

Operation for transmitting audio and video signals in that prior art video telephone apparatus will be described with reference to FIG. 2. Speech by voice is delivered from the hand set 1 or microphone 2 through the voice input/output circuit 3, the analog circuit 4, the matrix switch 5, and the telephone interface circuit 6 to the telephone line connection terminal 7. The audio signal from the person on the other end of the line is passed through the above signal path in the opposite direction and reproduced by the hand set 1 or speaker 8.

When transmitting a picture image signal in this case, the transmitter side sends a header including an ID code such as data on communicating capability to the receiver side for confirming that the set on the receiver side is a video telephone apparatus capable of communicating picture data in the same data format. After confirming that the other party has the same capability upon receipt of a header therefrom, the transmission of the picture data is carried out.

More particularly, with reference to FIG. 1, when an instruction for transmitting a picture image is issued with the use of the key pad 9, the CPU 11 detects this through the input/output port 10, and delivers a header in accordance with a program previously stored in the program memory 12 to the modulator/demodulator circuit 13. Therein, the header is converted into an analog signal and this signal is then transmitted through the matrix switch 5 from the telephone line connection terminal 7. The header from the other end is passed through the same path in the opposite direction and subjected to confirmation by the CPU 11 as to its code or the like.

In the meantime, picture images picked up by the television camera 14 are quantized in the image controller 15 and stored in the picture memory 16, and then, led out to the display 17 to be displayed thereon in succession, and the stored picture data are read out from the picture memory 16 under the instruction of the CPU 11 and delivered to the telephone line connection terminal 7. Incidentally, the picture data has a header added thereto indicating the data length or the like.

When the header from the other end of the line is received, it is acknowledged that reception of picture data will be started, and the matrix switch 5, based on a received carrier signal, switches, from the analog circuit 4 to the modulator/demodulator circuit 13, the delivering path of the incoming signal from the telephone interface circuit 6. After the received signal is demodulated in the modulator/demodulator circuit 13, the CPU 11 sends back a header or stores the data in the picture memory 16. Thereafter, the image controller 15 leads out the picture data prepared in its own system and the picture data received from the system on the other end from the picture memory 16 in succession to be displayed on the display 17. Also to the front of ordinary picture data is attached a simple header including an indication that picture data will follow.

When the transmission and reception of image data have been finished and there is no more carrier signal from the modulator/demodulator circuit 13, the matrix switch 5 connects the telephone interface circuit 6 with the analog circuit 4 and thereby resumes the voice communication.

In the case where the answerback from the receiver side is to be omitted, the information that it can be omitted is put in the header and picture data is transmitted in succession to the header. Even in this case, the receiver side, upon receipt of the header, prepares the arrangement for receiving the picture data in the same manner as described above.

Incidentally, the picture memory 16 of the prior art is composed of a camera-taken picture memory portion which stores picture information input from its own television camera 14, rewriting it at intervals of a predetermined period (e.g., 1/30 second), and an incoming picture memory portion for storing picture information obtained by demodulating still picture information received from the system on the other end of the line during the telephone call, and the memory portions of the picture memory 16 each have storage capacity for one page of picture information.

Now, the picture image display performed by the prior art video telephone apparatus at the time of signal reception will be described.

In the prior art video telephone apparatus, the transmitted and received picture image has only one resolution. Hence, as shown in FIG. 3, the video telephone apparatus reads out the image data stored in the region for storing the received image data in the picture memory 16 and displays this data on the display 17. In the event that it has received new picture data under that condition, it writes the received picture data in the same region of the picture memory 16. More particularly, as shown in FIG. 4, the received picture data is overwritten in the region for storing the received picture data in the picture memory 16.

The display on the display 17 in this instance is, as shown in FIG. 5, sequentially rewritten from the top of the picture plane. More particularly, FIG. 5(A) indicates the state on the display 17 before reception of new picture data, FIG. 5(B) indicates the state in the course of the reception, and FIG. 5(C) indicates the state when the reception has been finished.

Since the storage region of the camera-taken picture memory portion and the incoming picture memory portion in the picture memory of the prior art still picture video telephone apparatus each just have capacity for one page picture information as described above, there has been a problem that it is impossible to have picture information stored prior to transmission of a picture image.

Further, in the case where it becomes necessary to talk over a plurality of pages of picture information during a telephone call, since the picture memory has been renewed, there has been such a problem that a picture image which was earlier transmitted must be requested to be transmitted again, and therefore, the conversation has to be stopped on each of such occasions.

Furthermore, in the prior art still picture transmission technique, the reading out of the picture data from the picture memory 16 has only been possible to be performed in the unit of a predetermined frame.

Hence, a demand for such a performance of the system to have only a specific portion extracted from the unit picture data, excluding unnecessary data therefrom, and to transmit only the necessary data, thereby saving time for transmission, has not been met.

Further, in the case where the display picture plane of the system on the receiver side is smaller than the picture plane on the transmitter side, transmission in the prior art of all of the unit picture data corresponding to the whole display plane on the transmitter side involves a large loss of transmission cost and time.

Furthermore, when the resolution of the newly received picture data is different from the resolution of the previously received picture data, the prior art video telephone apparatus is unable to make a normal display. For example, if the resolution of the earlier received picture data was 160×100 as shown in FIG. 6(B) and the resolution of the newly received picture data is 96×100 as shown in FIG. 6(A), then the data array in the picture memory 16 becomes as shown in FIG. 6(B). Hence, it follows that there are picture data of two kinds of resolutions mixed in the picture memory 16. Therefore, in such a case, it has been impossible to decide with which resolution to make the display and it has been difficult to make a normal display on the display 17. Further, there has been such a problem that, when the data is read out from the picture memory 16 with either of the resolutions and thereby displayed on the display 17, the picture image with one of the resolutions is greatly disturbed and an obscure display is made.

Besides, there has been a problem in the prior art still picture video telephone transmission system that, when picture data has been transmitted from a still picture video telephone apparatus having a different aspect ratio of vertical height to horizontal width of the picture plane, it cannot be displayed.

SUMMARY OF THE INVENTION

A first object of the present invention is to provide a still picture video telephone apparatus capable of storing a self-prepared picture image in advance and also storing a plurality of pages of picture images incoming from the system on the other end of the line.

A second object of the present invention is to provide a method for transmitting a still picture image capable of extracting, according to the need, only a desired portion of the picture data stored in the picture memory, thereby achieving highly efficient short-time transmission.

A third object of the present invention is to provide a method for display a still picture image for use in a still picture video telephone apparatus whereby a clear picture image displaying can be performed even if picture data of a different resolution is received.

A fourth object of the present invention is to provide a method for transmitting a still picture image whereby accurate display can be performed by the signal receiver side even if picture data of a different aspect ratio is received.

In order to achieve the above mentioned first object, the still picture video telephone apparatus according to the present invention comprises a picture memory for storing a plurality of pages of picture information consisting of a camera-taken picture memory portion which rewrites still picture information input therein delivered from the television camera at intervals of a predetermined period, a self-prepared picture memory portion which stores desired still picture information until arrival of a rewrite instruction, and an incoming picture memory portion which sequentially rewrites still picture information therein upon receipt of still picture information when its storage regions are filled up, an input means of memory region information for setting up regions for the self-prepared picture memory portion and the incoming picture memory portion within the picture memory, and a picture memory control circuit for controlling still picture information input to and output from the picture memory based on the memory region information.

Accordingly, the still picture video telephone apparatus according to the present invention is capable of storing a plurality of pages of still picture information and allocating memory regions to the self-prepared picture memory portion and the incoming picture memory portion in various ways.

Further, according to the present still picture video telephone apparatus, it is possible to store desired picture information in the self-prepared picture memory portion of the picture memory and retain the picture information stored in the self-prepared picture memory portion until an erase signal is input thereto through the picture memory control circuit.

Furthermore, by setting up a plurality of pages of storage regions in the incoming picture memory portion, there is no need for requesting the person on the other end of the line to transmit the same picture information again as long as the number of received pages therefrom is within the set up number of pages.

Besides, the storage regions allocated to the self-prepared picture memory portion and the incoming picture memory portion within the picture memory can be set up at will according to convenience of the user.

In order to achieve the above mentioned second object, the present invention is adapted such that, when it is desired to transmit only a portion of the picture data stored in the picture memory, that portion is transferred to and stored in another specific region within the picture memory, and the transferred and stored picture data is sequentially read out and transmitted to the system on the other end through the telephone line.

Hence, according to the method of the present invention, the picture data taken in from the television camera is once written into the picture memory as a whole and then displayed on a display monitor.

When an instruction to transmit only a portion of the picture data is received, corresponding partial picture data is transferred to and stored in another specific region within the picture memory.

Then, the transferred and stored picture data is sequentially read out to be displayed again on the display, and thereafter, the data is converted into a transmission signal to be transmitted through the telephone line.

Further, in order to achieve the third object of the present invention, the method for displaying picture image for use in a still picture video telephone apparatus according to the present invention is adapted therein such that resolution of received still picture data is acknowledged according to data attached to the picture data, the received still picture data is sequentially stored in a special reception region, and during reception of the still picture data, the still picture data stored in the special reception region is displayed on a display in accordance with the recognized resolution of the still picture data, and further, the still picture data stored in the special reception region is transferred to the picture memory for use in displaying a picture image at the time of the normal operation, and after the end of the signal reception, the data stored in the special reception region is erased. Hence, even when picture data of a different resolution is received, the picture data is displayed on a display during the signal reception, in accordance with a predetermined resolution.

Thus, in the method for displaying picture image for use in a still picture video telephone apparatus according to the present invention, when still picture data is received, the resolution of the still picture data is first recognized according to the data incoming prior to the arrival of the picture data to be received.

When the still picture data has been received, the picture data is stored in the special reception region within the picture memory and at the same time the picture data stored in the special reception region is displayed on the display. Here, the special reception region is a separate region from the storage region for storing the incoming picture data for use under the normal operation.

When the signal reception has been finished, the picture data stored in the special reception region is erased. When the next picture data is received and it is displayed, its display is performed in accordance with the resolution of the then received picture data, irrespective of the previously received picture data. Thus no disturbed display is made at the time of signal reception.

In order to achieve the fourth object of the present invention, the method for transmitting still picture image of the present invention is characterized therein by putting data on the aspect ratio of the picture plane in the header of the picture data to be transmitted and received, and when data of a relatively wider, to be strict, a smaller aspect ratio than that of its own picture plane is obtained, the picture data thereof corresponding to at least a portion of the peripheral region in the horizontal direction of its own picture plane is deleted therefrom so that display adapted for the picture plane on the receiver side is obtained.

The method for transmitting still picture image of the present invention is also characterized therein by that data on aspect ratio of the picture plane is put in the header of the picture data, and further, when data of a different aspect ratio of the picture plane is received, picture data of a predetermined pattern stored in advance is added to at least a portion of the peripheral region of its own picture plane so that a display adapted for its own picture plane is carried out.

Thus, according to the method for transmitting still picture for use in a still picture video telephone apparatus according to the present invention, since the header of the picture data includes data on number of pixels of picture image signal and of the aspect ratio of the picture plane, the system on the receiver side can acknowledge what aspect ratio of the picture plane the incoming data has.

Hence, when the picture data received has a different aspect ratio from that of its own picture plane, the data corresponding to portions of the peripheral region of the picture data received is deleted, or the specific pattern is added to the portions corresponding to the peripheral region of its own picture plane, so that a display adapted for its own picture plane can be performed.

Thus, this invention makes it possible to provide communication between still picture video telephone apparatus with different picture configuration.

BRIEF DESCRIPTION OF THE DRAWINGS

FIGS. 5A-5C are an explanatory diagram showing states of picture images at the time of signal reception in the prior art example;

FIGS. 6A and 6B are explanatory diagrams showing stored states of picture data in the prior art example;

FIG. 9 is a chart of procedures in the method for storing data in a self-prepared picture memory portion of a picture memory according to the present invention;

FIG. 14 is a flow chart showing operations at the time of signal reception in an embodiment of a method for displaying still picture for a third object of the present invention;

FIGS. 16A-16C are an explanatory diagram for explaining displayed states on a display at the time of signal reception in the above embodiment;

DETAILED DESCRIPTION OF THE PREFERRED EMBODIMENTS

A preferred embodiment of a still picture video telephone apparatus for the first object of the present invention will be described below with reference to the accompanying drawings.

Figure 1:
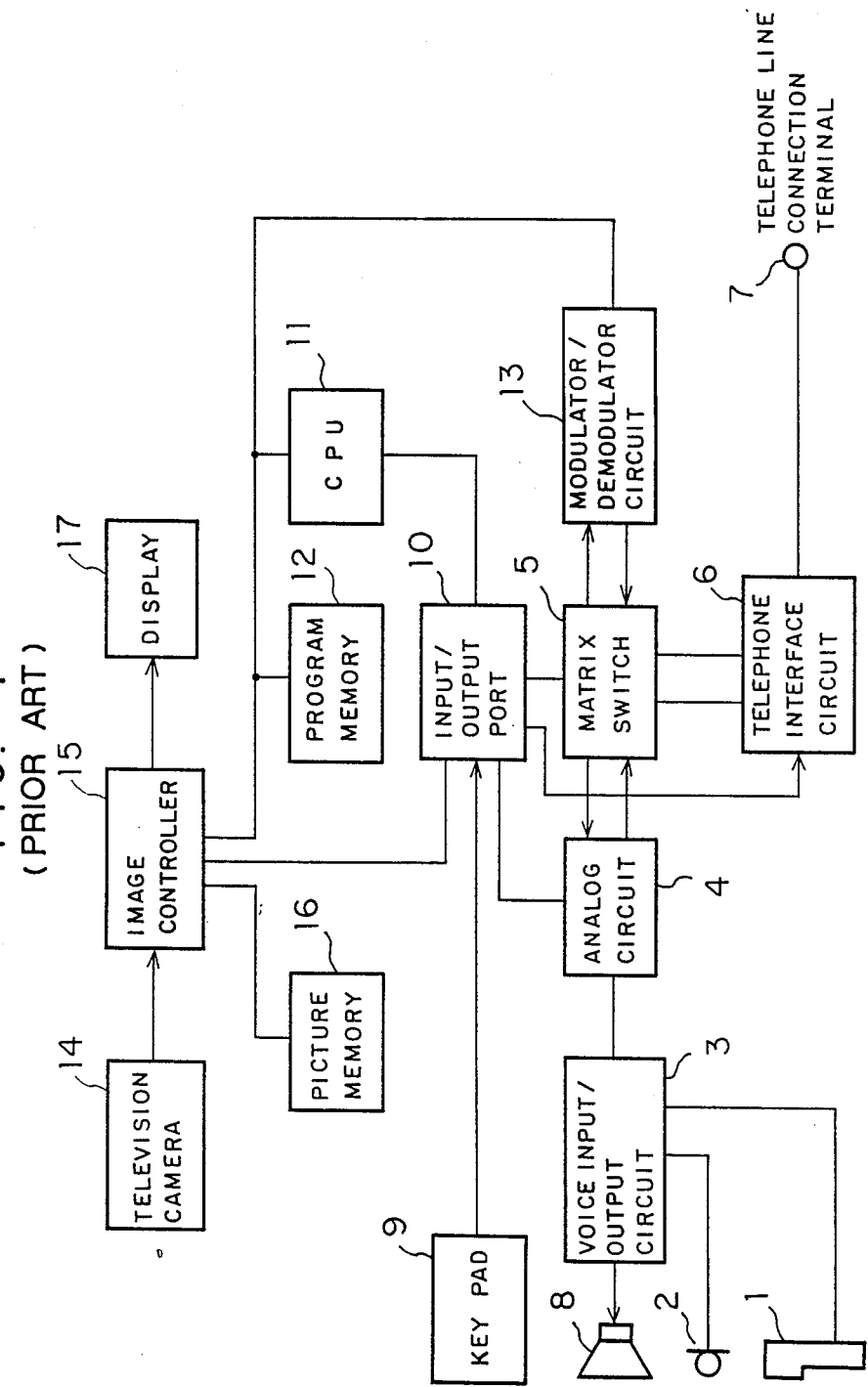
FIG. 1 is a block diagram showing a prior art still picture video telephone apparatus.
Figure 2:
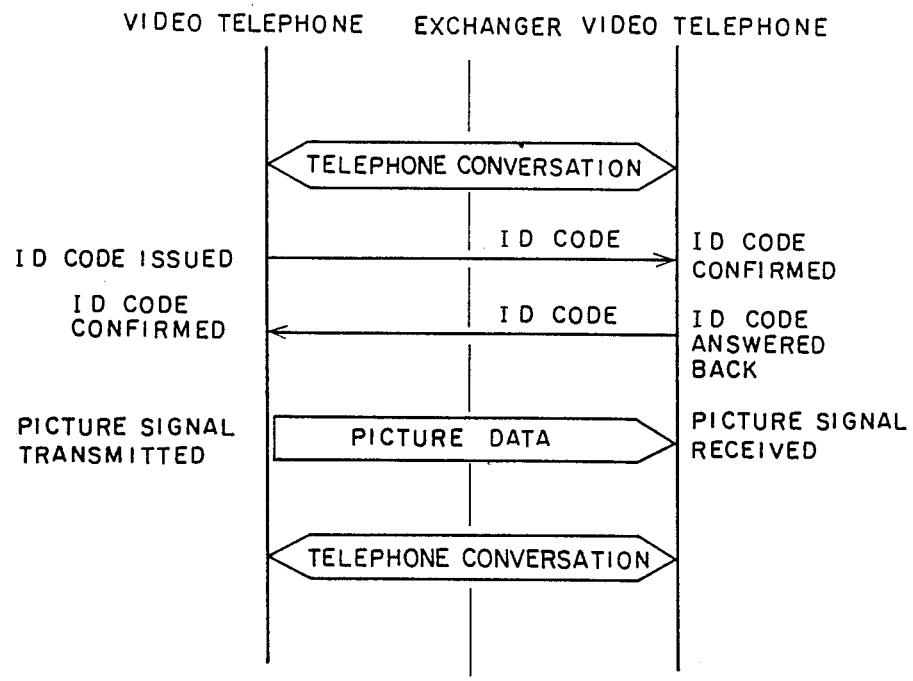
FIG. 2 is an explanatory diagram of communicating procedures in a prior art still picture video telephone apparatus.
Figure 7:
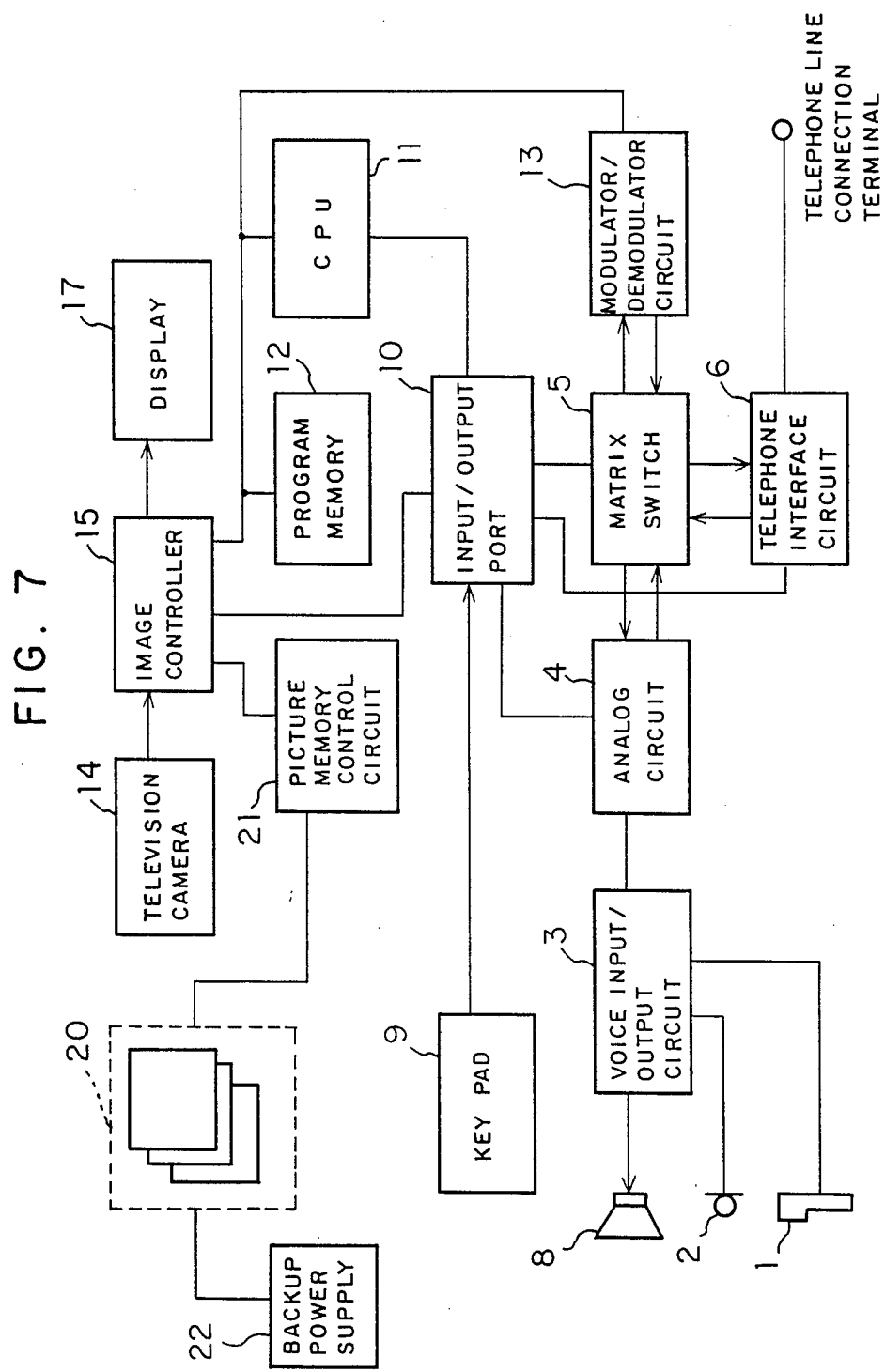
FIG. 7 is a block diagram of a first embodiment of a still picture video telephone apparatus for a first object of the present invention.

FIG. 7 is a block diagram of a first embodiment of the present invention, wherein corresponding parts to those in the prior art example in FIG. 1 are denoted by corresponding reference numerals and hence explanation thereof will be omitted.

The present embodiment is characterized in that it comprises a picture memory 20 storing a plurality of pages of picture information, a picture memory control circuit 21 for controlling input and output of picture information to and from the picture memory 20, and a backup power supply 22 for supplying current to the picture memory 20.

Further, an input means of memory region information for setting up regions for a self-prepared picture memory portion and an incoming picture memory portion within the picture memory 20 is provided in the key pad 9.

Figure 8:
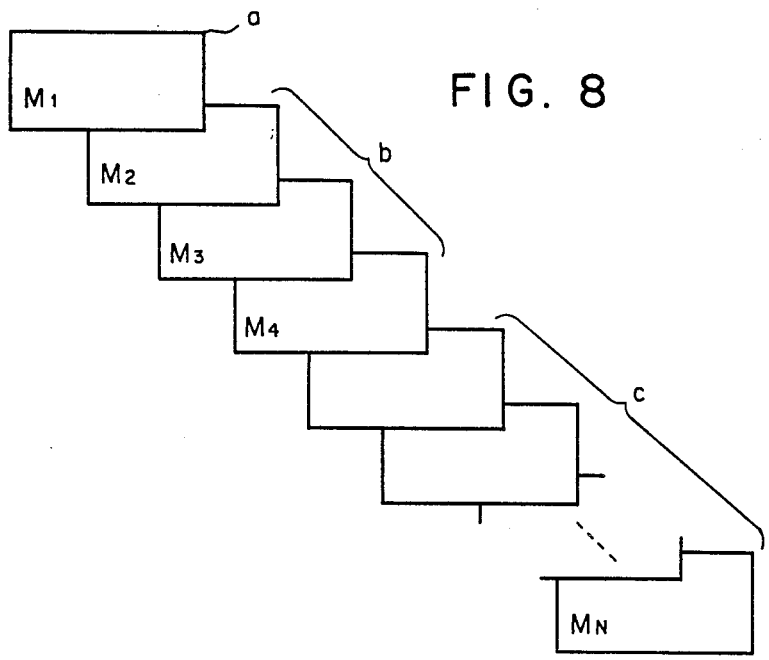
FIG. 8 is an explanatory diagram of a picture memory according to the present invention.
Figure 3:
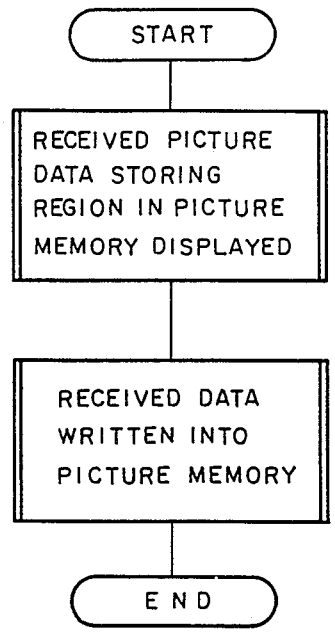
FIG. 3 is a flow chart showing data writing at the time of signal reception in a prior art.
Figure 4:
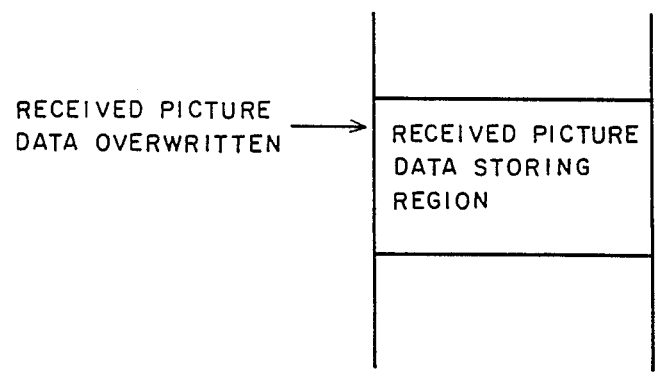
FIG. 4 is an explanatory diagram showing a stored state of received picture data in the prior art example.

The picture memory 20 is a memory capable of storing totally N picture pages as shown in FIG. 8 and consists of a camera-taken picture memory portion (a), self-prepared picture memory portion (b), and incoming picture memory portion (c).

When the number of picture pages stored in the self-prepared picture memory portion is represented by l, the number of picture pages stored in the incoming picture memory portion, m, equals N-l-1.

The picture information in the camera-taken picture memory portion (a) is rewritten at intervals of a predetermined period (1/30 second), while the picture information stored in the self-prepared picture memory portion (b) is retained until an erase instruction is read thereby.

The incoming picture memory portion (c) is a memory for storing received picture information. Upon receipt of new pages of picture information when its memory regions are filled up, it sequentially rewrites the information therein.

When the number of picture planes ($0 \leq l \leq N-2$) to be stored in the self-prepared picture memory portion (b) is set up as the memory region information for the picture memory 20 and entered by means of the key pad 9, the memory region information is input through the input/output port 10 to the picture memory control circuit 21.

Then, the picture memory control circuit 21, based on the memory region information, performs allocation of the memory regions within the picture memory 20.

Now, the method for storing information in the self-prepared picture memory portion (b) will be described with reference to FIG. 9.

First, desired picture information is read by the television camera 14 and it is displayed on the display 17 as a live picture display updated at intervals of 1/30 second.

At the same time, the picture information taken by the television camera 14 is updated and stored in the camera-taken picture memory portion (a) of the picture memory 20.

When a desired picture image is obtained, the user inputs an instruction signal for providing a still display on the display 17 using the key pad 9.

Upon receipt of the instruction signal for a still display, the picture memory control circuit 21 stops the updating in the camera-taken picture memory portion (a).

Then, the user, using the key pad 9, selectively inputs the memory number indicating the storage position in the self-prepared picture memory portion (b) into which the desired picture information is to be stored.

Reading the memory number through the input/output port 10, the picture memory control circuit 21 displays on the display 17 the picture information currently stored in the region of the self-prepared picture memory portion (b) corresponding to that memory number.

The user confirms the picture image displayed on the display 17, and if it can be erased, enters an instruction using the key pad 9 to rewrite the self-prepared picture information (confirmation process).

Upon receipt of the instruction to rewrite the self-prepared picture information through the input/output port 10, the picture memory control circuit 21 writes the picture information currently stored in the camera-taken picture memory portion (a) into the region in the self-prepared picture memory portion (b) where the aforesaid displayed picture information has been stored.

In the confirmation process, if the picture information corresponding to the selected memory number is desired to be retained, the user can reenter the memory number, whereby making an error to erase necessary picture information is prevented.

Now, writing picture information into the incoming picture memory portion will be described.

First, incoming picture information is produced by demodulating a picture signal received through the communication line.

Each of pages of incoming picture information is stored through the picture memory control circuit 21 into the incoming picture memory portion (c) of the picture memory 20, sequentially from the front position.

At the time of reception of the incoming picture images, if the storage regions of the incoming picture memory portion (c) are filled up with received picture information, newly received incoming picture information is overwritten into the front position of the incoming picture memory portion (c).

Thus, according to the present embodiment, desired picture images can be stored in advance, as pictures to be transmitted, in the self-prepared picture memory portion (b) of the picture memory 20.

Also the incoming picture memory portion (c) can be arranged so that a plurality of pages are stored therein, and hence, the need for repeated transmission of the same picture information can be eliminated and operability of the apparatus is enhanced.

A second embodiment of the present invention will be described below.

Figure 10:
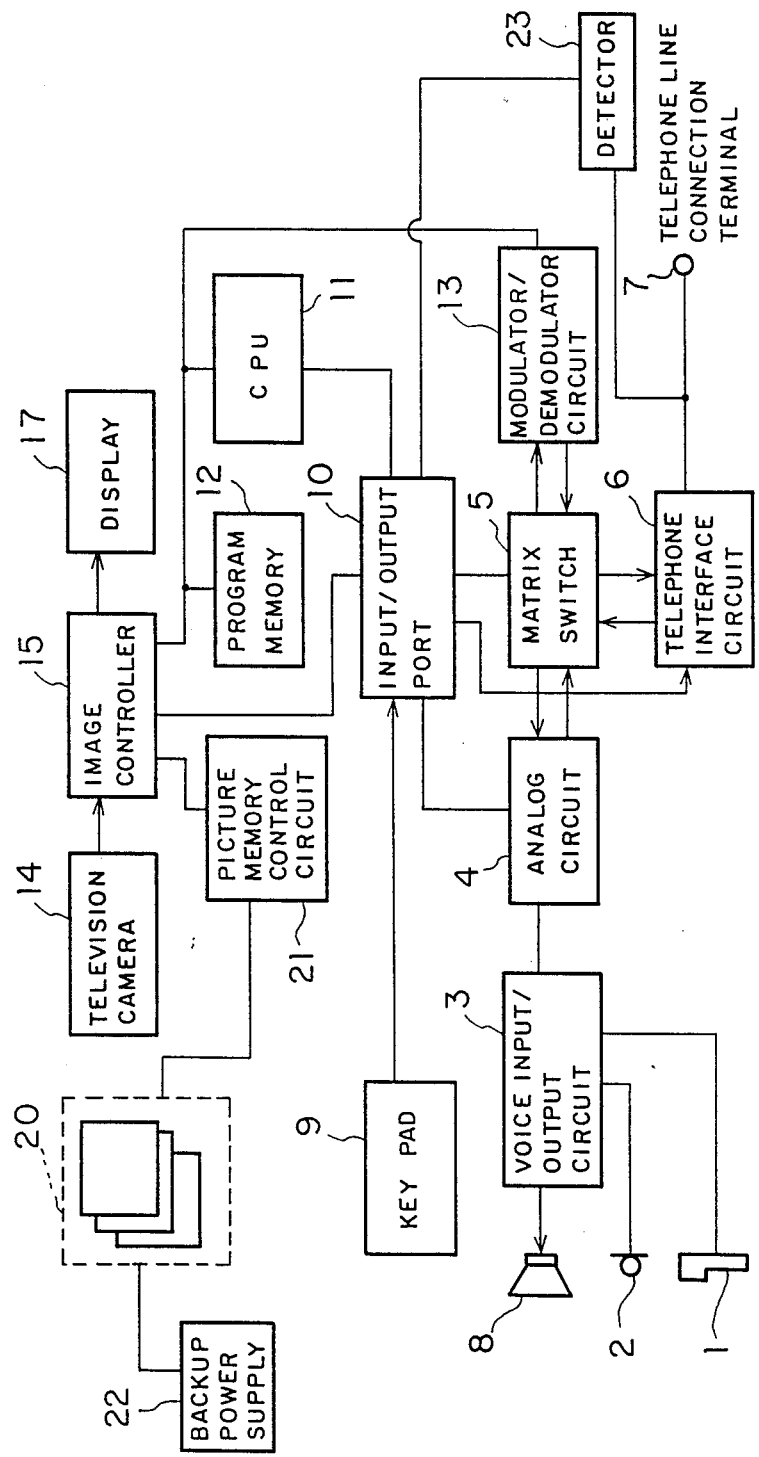
FIG. 10 is a block diagram of a second embodiment of a still picture video telephone apparatus according to the present invention.

FIG. 10 is a block diagram showing configuration of the present embodiment, wherein corresponding parts to those in the first embodiment are denoted by corresponding reference numerals and hence description thereof will be omitted.

Referring to FIG. 10, reference numeral 23 denotes a detector circuit for detecting a loop-off to detect the end of a call. Upon receipt of the detected signal therefrom, the picture memory control circuit 21 erases the picture information in the incoming picture memory portion (c) of the picture memory 20.

The manner of storing the incoming picture information and the self-prepared picture information into the picture memory 20 is the same as that in the first embodiment and hence description thereof will be omitted.

Operations characteristic of the apparatus of the present embodiment will be described below.

The detected signal from the detector circuit 23 detecting a loop-off is input through the input/output port 10 to the picture memory control circuit 21.

The picture memory control circuit 21, upon receipt of the detected signal, erases the picture information stored in the incoming picture memory portion (c) of the picture memory 20.

According to the present embodiment, the incoming picture information can be erased after a call is finished, and hence, such an effect is obtained that privacy of the user can be protected when other persons also use the same apparatus.

Although an example of erasing the picture information stored in the incoming picture memory portion at the end of a call was mentioned in the second embodiment above, the same effect will be obtained by erasing the incoming picture information upon detection of off/on of the power supply, i.e., the rise of the still picture video telephone apparatus at next time, while keeping the self-prepared picture memory portion (b) supplied with current from the backup power supply.

As described above, the still picture video telephone apparatus for the first object of the present invention has a picture memory capable of storing self-prepared picture information as well as a camera-taken picture image as picture information to be transmitted and also capable of storing incoming picture information and further a function enabling the user to allocate the memory regions to the self-prepared memory portion and the incoming picture memory portion in various ways at will. Hence, a still picture video telephone apparatus with high operability can be provided.

Now, an embodiment of a method for transmitting still picture for use in a still picture video telephone apparatus for the second object of the present invention will be described.

Figure 11:
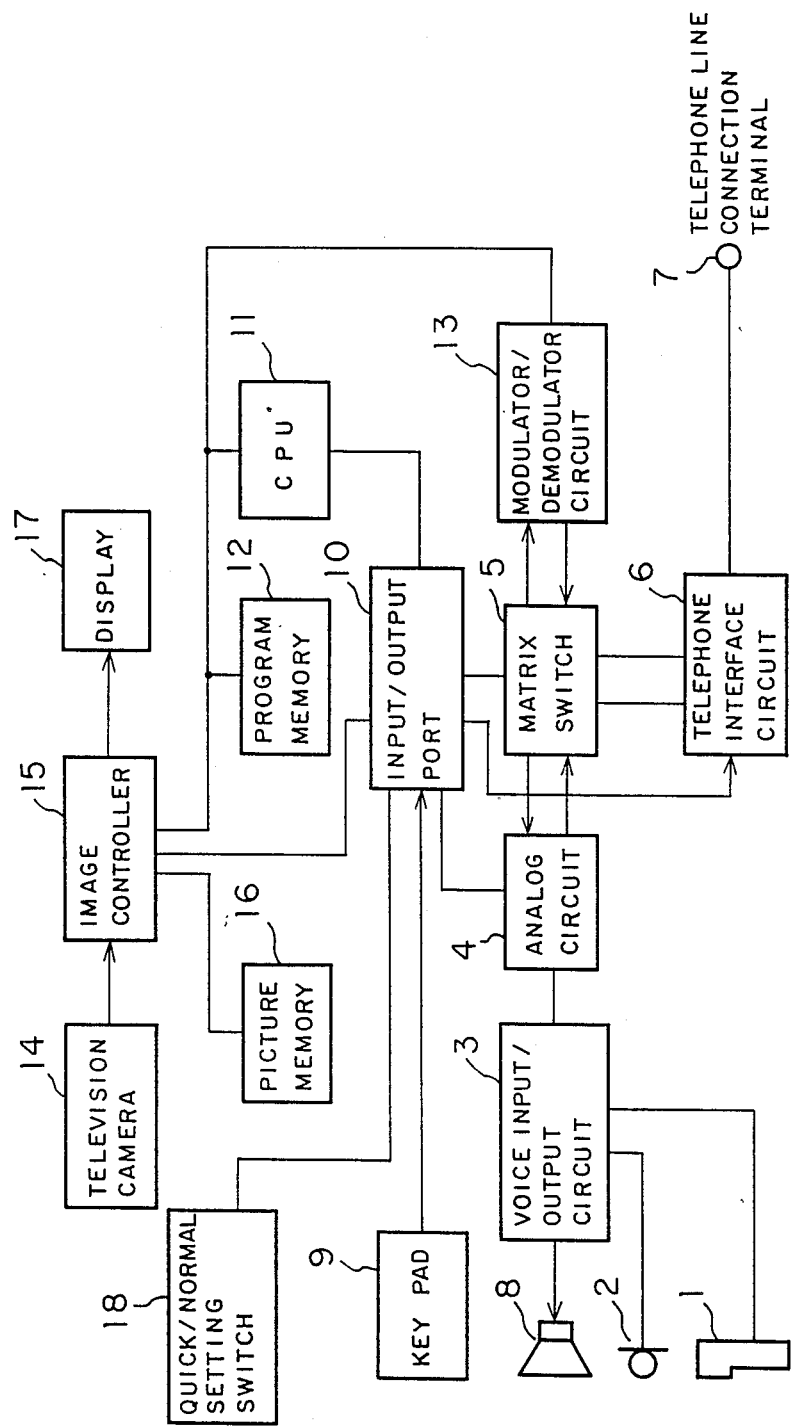
FIG. 11 is a block diagram showing a configuration example of a still picture video telephone apparatus to which a method for transmitting still picture image for a second object of the present invention is applied.

FIG. 11 shows an example of configuration of a still picture video telephone apparatus to which the method of the present invention is applied. What is characteristic of the present embodiment is that a desired portion extracted from picture data stored in the picture memory is transferred to and stored in another specific region within the same picture memory and the transferred and stored data only is enabled to be transmitted.

As apparent from the drawing, this still picture video telephone apparatus is newly provided with a quick-/normal setting switch 18, and by operating the switch to change the setting, it is made possible at will either to transmit the whole of a camera-taken picture image or to transmit a portion thereof.

Figure 12:
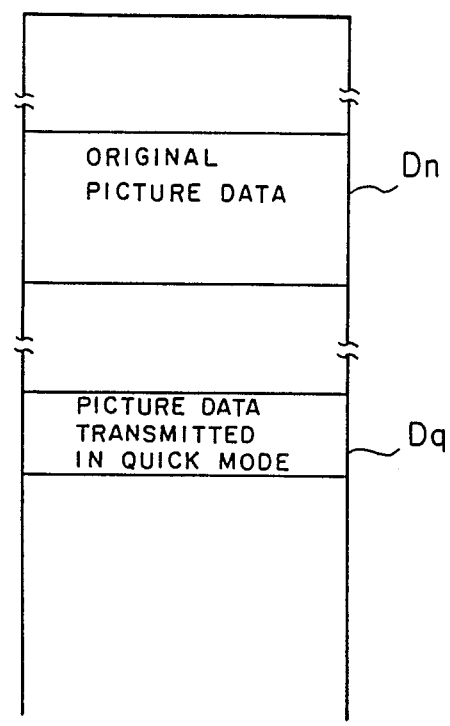
FIGS. 12A and 12B are explanatory diagrams of memory maps within a picture memory in FIG. 11.
Figure 12:
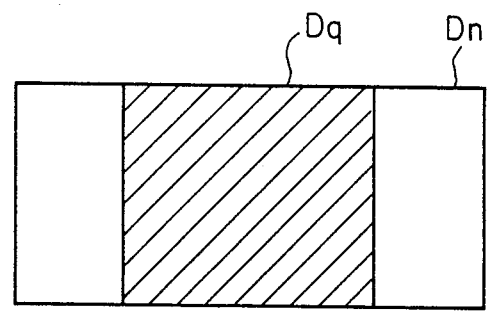

FIG. 12(A) shows a diagram explaining transfer and storage of the picture data within the picture memory 16, from which it is known that, when the quick/normal switch 18 is turned on, only partial picture data $D_q$ corresponding thereto extracted from the original data $D_n$, that are taken in by the television camera 14 and written as they are through the image controller 15 into the picture memory 16 in succession, is transferred to another specific region within the picture memory 16 and stored therein. The relation of the transferred picture data $D_q$ to the original picture data $D_n$ is expressed, for example, as shown in FIG. 12(B). Only the specified portion of the unit picture data indicated by oblique lines in the drawing becomes the object of transmission. Further, the picture data at the specified portion becoming the object of transmission has the data amount previously set to be in accordance with the display picture plane of the system on the other end of the line.

Operations in the method according to the present embodiment will be concretely described with reference to FIG. 13.

Figure 13:
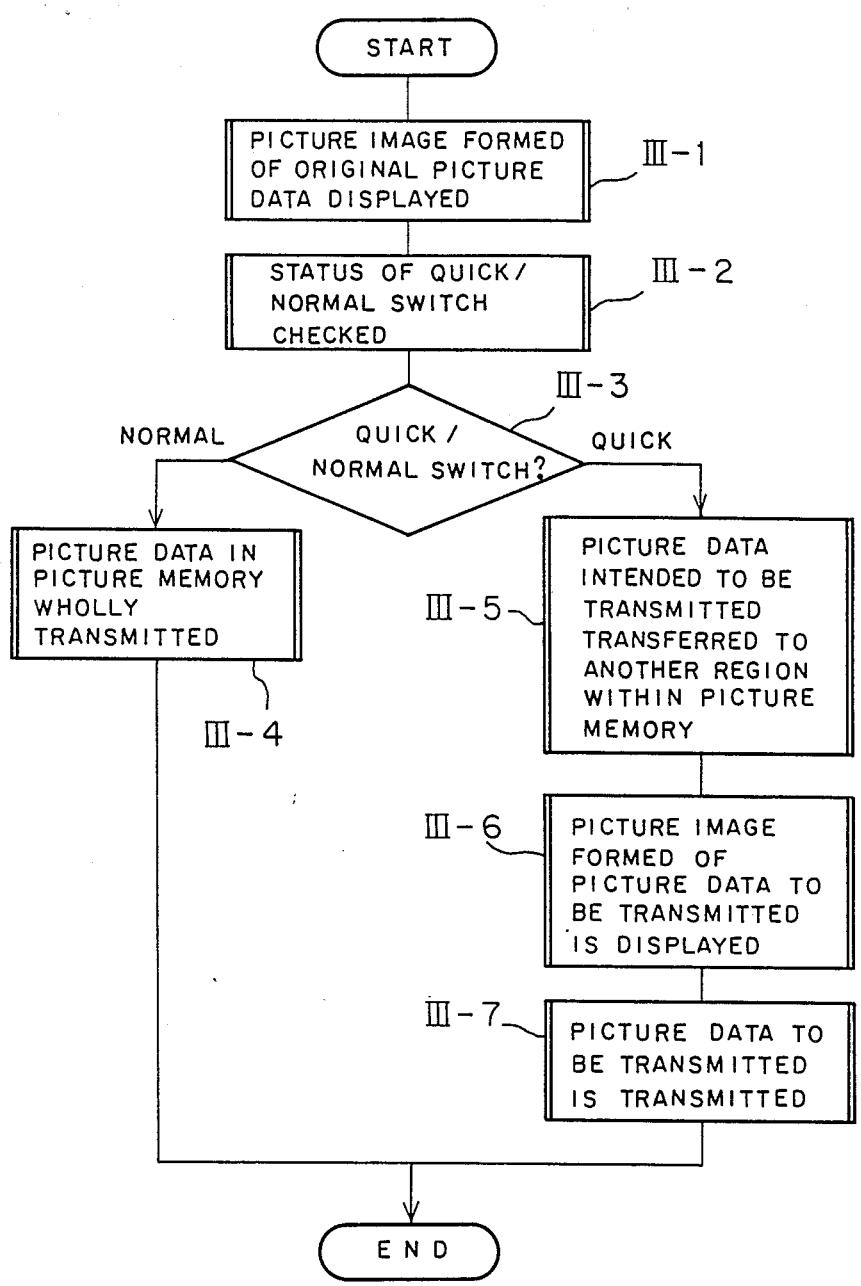
FIG. 13 is a transmission flow chart of picture data in a method according to the present invention.

FIG. 13 is a flow chart of transmission of picture data from the picture memory 16 according to the present embodiment.

First, original picture data $D_n$ taken in by the television camera 14 and written into the picture memory 16 through the image controller 15 is once wholly displayed on the display 17 (III-1). Then, the CPU 11 checks through the input/output port 10 the status of the quick/normal setting switch 18 (III-2), and proceeds to the next steps depending on the state of the switch (III-3).

When the switch 18 is setting the normal mode, the existing picture data $D_n$ stored in the picture memory 16 is wholly transmitted (III-4).

On the other hand, when it is setting the quick mode, the CPU 11 transfers a partial picture image $D_q$, having a data amount preset to follow the display picture plane size of the system on the other end of the line and extracted from the existing picture data $D_n$ as the object of transmission, to another specified region within the picture memory 16 through the image controller 15 and stores the same therein (III-5).

Then, only the transferred and stored partial picture data $D_q$ is displayed on the display 17 (III-6), whereby the user is enabled previously to confirm, on the display, the partial picture image to be transmitted.

When the preparatory extraction of the partial picture image for transmission is thus finished, the CPU 11 subjects the partial picture image data $D_q$ to conversion into a predetermined transmission signal in the modulator/demodulator circuit 13, in the same manner as in the above mentioned transmission of the existing picture data $D_n$, and delivers the signal to the system on the other end through the telephone line (III-7).

Thus, according to the method of the present embodiment, only a specified portion of the picture data $D_q$ desired to be transmitted is separated from the existing picture data $D_n$ within the picture memory 16 by the aforesaid transferring and storing operation and only the transferred and stored partial picture data $D_q$ is transmitted. Hence, it is made possible to transmit only necessary portion of picture image in a short time and at low cost, and further, to achieve transmission flexibly following the size of display picture plane of the system on the other end.

In summary, according to the method for the second object of the present invention, only a portion of the picture data desired to be transmitted is separated from the picture data taken in by the television camera and stored into the other specific region within the picture memory, and only the separated partial picture data is processed for transmission. Thus, still picture transmission being quick and efficient and meeting various requirements can be carried out.

Now, a method for displaying a picture image for use in a still picture video telephone apparatus for the third object of the present invention will be described with reference to the drawings.

FIG. 14 is a flow chart showing operations in the present embodiment of the invention.

First, at the stage before receiving new picture data, the display 17, in the same manner as in the above described prior art example, displays the picture data stored in the region of the picture memory 16 for storing the picture data already received. Then, according to the present embodiment, when new picture data is received, the newly received picture data is stored nor into the ordinary storage region for received picture data, but into a special reception region separately provided in the picture memory 16, and at the time of this reception, the image controller 15 reads the picture data in the special reception region and displays the data on the display 17.

In this instance, according to the present invention, the transmitter side transmits information about the resolution of the picture data prior to the transmission of the picture data. More particularly, the header of the prior art is arranged to include that information. Accordingly, the receiver side is enabled to read and display on the display 17 the picture data stored in the special reception region in accordance with the resolution of the received picture data. For example, when the resolution included in the header of the received picture data is 96×100, the CPU 11 sets up the resolution, 96×100, in the image controller 15 so that the received picture data is displayed on the display 17 in accordance with the resolution, 96×100, whereas when the received resolution is 160×100, the received picture data, in the same manner as above, is displayed in accordance with the resolution, 160×100. Here, the picture data being received is sequentially overwritten in the special reception region of the picture memory 16.

Figure 15:
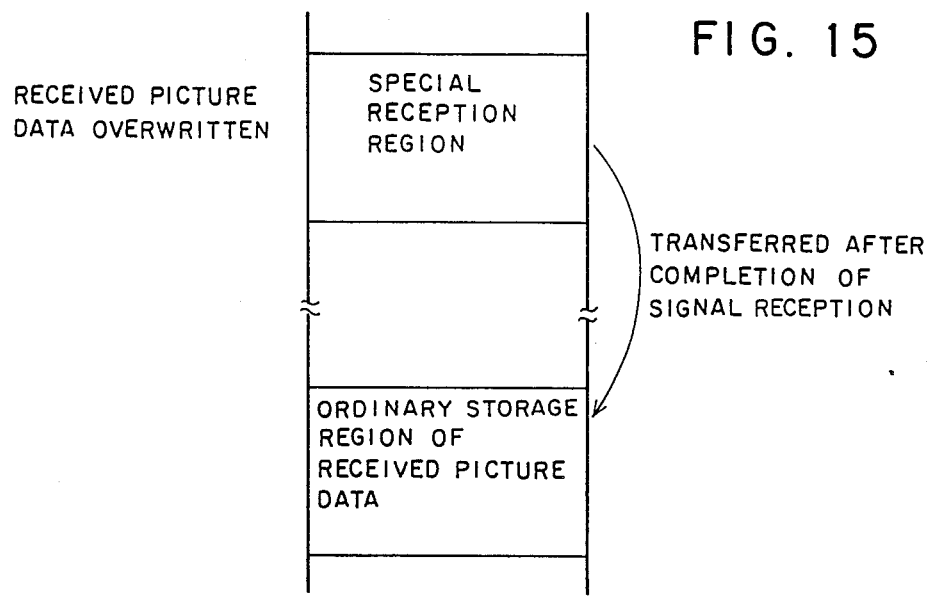
FIG. 15 is an explanatory diagram showing structure of a picture memory in the above embodiment.

When the storage of the received picture data in the special reception region is finished, the picture data in the special reception region is transferred, as shown in FIG. 15, to the ordinary storage region, namely, to the ordinary storage region for use under normal operation in the picture memory 16. Upon completion of the transfer, the reading from the special reception region is stopped and the reading from the ordinary storage region is started and, at the same time, the stored contents in the special reception region are cleared.

By this clearing of the special reception region, the special reception region is always kept cleared except when receiving a signal. Hence, when the picture data stored in the special reception region at the time of signal reception is read by the image controller 15 and displayed on the display 17, the area where no picture data has been overwritten is all in a state without any data, namely, in white color in general. FIG. 16(A) shows this state.

Further, if the clear is carried out by giving a predetermined single color to the picture plane, the initial picture plane during signal reception will be in that predetermined single color and this picture plane will be gradually rewritten into the received picture image as shown in FIG. 16(P) and FIG. 16(C).

According to the present embodiment as described above, the picture plane in the single color is gradually rewritten into the received picture image as shown in FIGS. 16(A), (B), and (C). Hence, even when picture data of a different resolution is received, the picture image during the reception is not at all disturbed and is smoothly displayed on the display 17. When the signal reception is finished, it is then possible to make a display from the ordinary region of the picture memory 16 in the same way as in the normal case, and the apparatus is thus made ready for receiving next incoming signal.

According to the method for displaying picture image for use in the video telephone apparatus of the present embodiment, there is provided, in the picture memory, another reception region separate from the ordinary region for received picture image, and the incoming picture data is stored in this reception region during the signal reception, and further, the picture data read out from this reception region is displayed in accordance with the received resolution thereof. Hence, the picture image displayed on the display is not disturbed even during the signal reception.

Now, an embodiment of a method for transmitting still picture image for use in a still picture video telephone apparatus for the fourth object of the present invention will be described.

The method for still picture transmission according to the present invention is characterized in the procedures carried out within the CPU 11. The component parts 1 to 17 of the apparatus are the same as those in the prior art example as shown in FIG. 1 and hence explanation thereof will be omitted.

What is characteristic of the present embodiment is firstly that the header preceding the picture data to be transmitted and received is provided with data representative of the aspect ratio of the picture plane of the system of the transmitter.

Such data may be put in the header used for exchange of the ID codes to be performed prior to transmission and reception of the picture data, as in the prior art example, or it may be put in the header provided at the front portion of the picture data.

The CPU 11, according to the program previously stored in the program memory 12, prepares the header including the data representative of the aspect ratio of its own display 17.

In this case, in the header for the ID code as aforesaid or the header to be provided at the front portion of the picture data, there are generally included such data on the picture data as number of lines, number of data, extension bits, and FCS (frame check sequence) and the like, other than the pixel data frame representative of the aspect ratio of its own.

Figure 21:
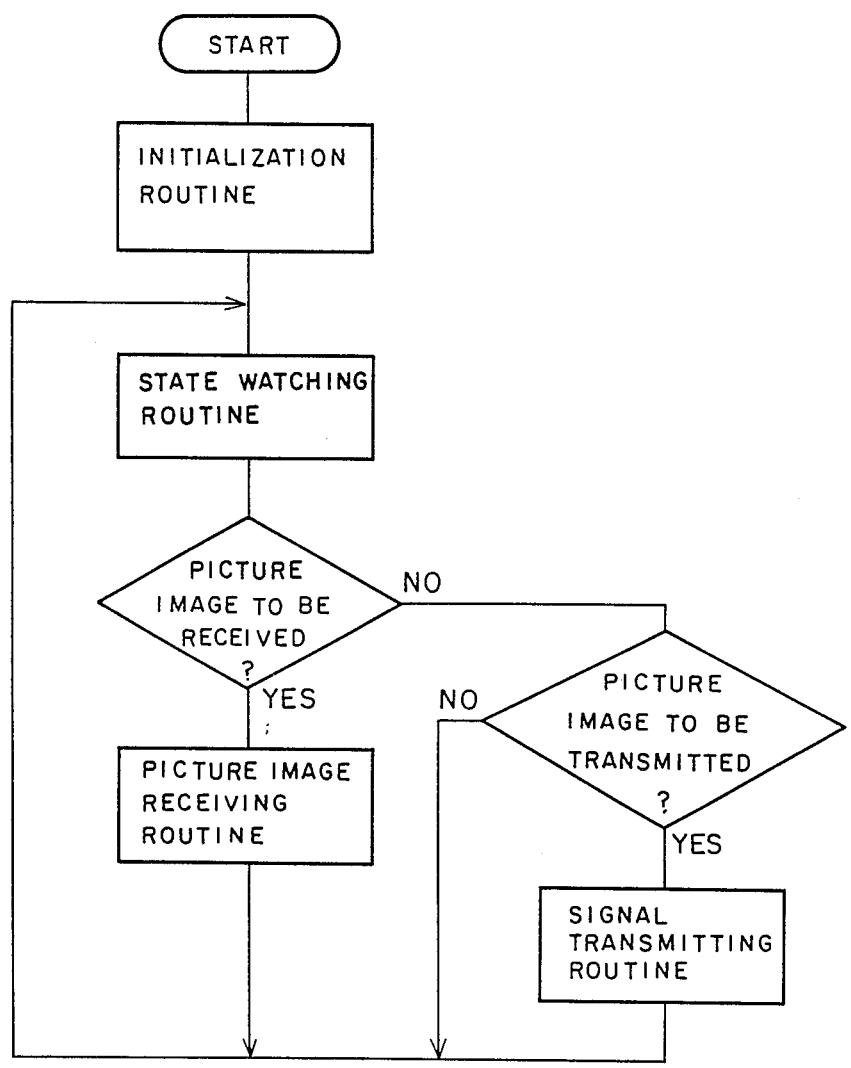
FIG. 21 is a flow chart for explaining overall operations in the above mentioned method for transmitting still picture.

In receiving picture data, the CPU 11, in the present embodiment, first receives the header. It recognizes the aspect ratio included in the header and determines whether or not the aspect ratio is in agreement with that of its own picture plane. If it is in agreement therewith, the CPU 11 performs ordinary processes as heretofore. FIG. 21 is a flow chart describing such ordinarily performed processes.

If the aspect ratio of the incoming picture data is different from the aspect ratio of its own picture plane, the following processes are performed.

Figure 19:
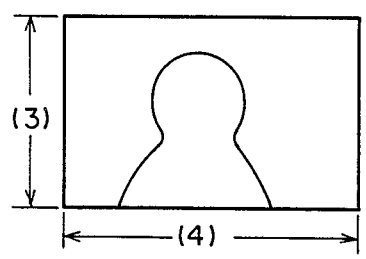
FIG. 19 is an explanatory diagram showing another example of a display on a still picture video telephone apparatus in the above embodiment.
Figure 18:
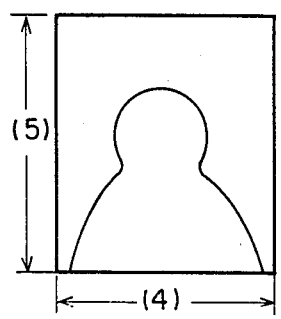
FIG. 18 is an explanatory diagram showing an example of a display on a still picture video telephone apparatus in the above embodiment.

For example, in the case where the number of pixels of its own picture plane is 96×96 and its aspect ratio is 4 Wide:5 High as shown in FIG. 18 and its received picture data has 96×96 pixels and an aspect ratio of 4 High:3 Wide as shown in FIG. 19, if the apparatus should display the picture data as it is, a vertically elongated, strange picture would be displayed. Hence, in the present embodiment, the CPU 11 deletes the data corresponding to predetermined pixels of the received picture data before displaying the picture on the display.

Figure 17:
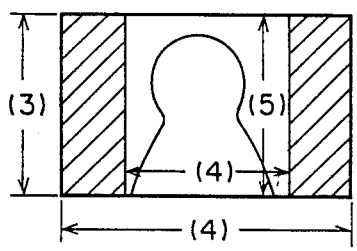
FIG. 17 is an explanatory diagram showing picture data processing to which an embodiment of a method for transmitting still picture for a fourth object of the present invention is applied.

More particularly, from 96 picture data each on the first line to the 96th line, the first to 20th and 77th to 96th data corresponding to both sides of its own picture plane are deleted. Thereby, in the display on the display 17, the data in the area indicated by oblique lines in FIG. 17 are deleted and only the central portion in FIG. 17 is displayed. Thus, a picture plane virtually equal to that shown in FIG. 18 is obtained.

Here, since the picture image at both side portions in FIG. 19 are deleted, what were displayed there on the transmitter side are not displayed on the receiver side. However, in many cases with still picture video telephone apparatus, the transmitted picture images are those for pictures of the person on the transmitter side or the like, and therefore, the deletion of both the side portions are not much of a problem in most cases. Since, however, the display on the receiver side in this example must be of 96×96 pixels, the CPU 11 gives some treatment, such as interpolation of the same data as adjoining data, to the data so that a display corresponding to 96×96 is obtained In this way, an accurate display can be obtained even when picture data of a different aspect ratio is received.

Further, even when the received picture data is also different in number of pixels, a matching treatment for number of pixels may first be given to the received picture data and then the data corresponding to the pixels at both sides may be deleted, and thereby, the same effect as described above will be obtained.

Figure 22:
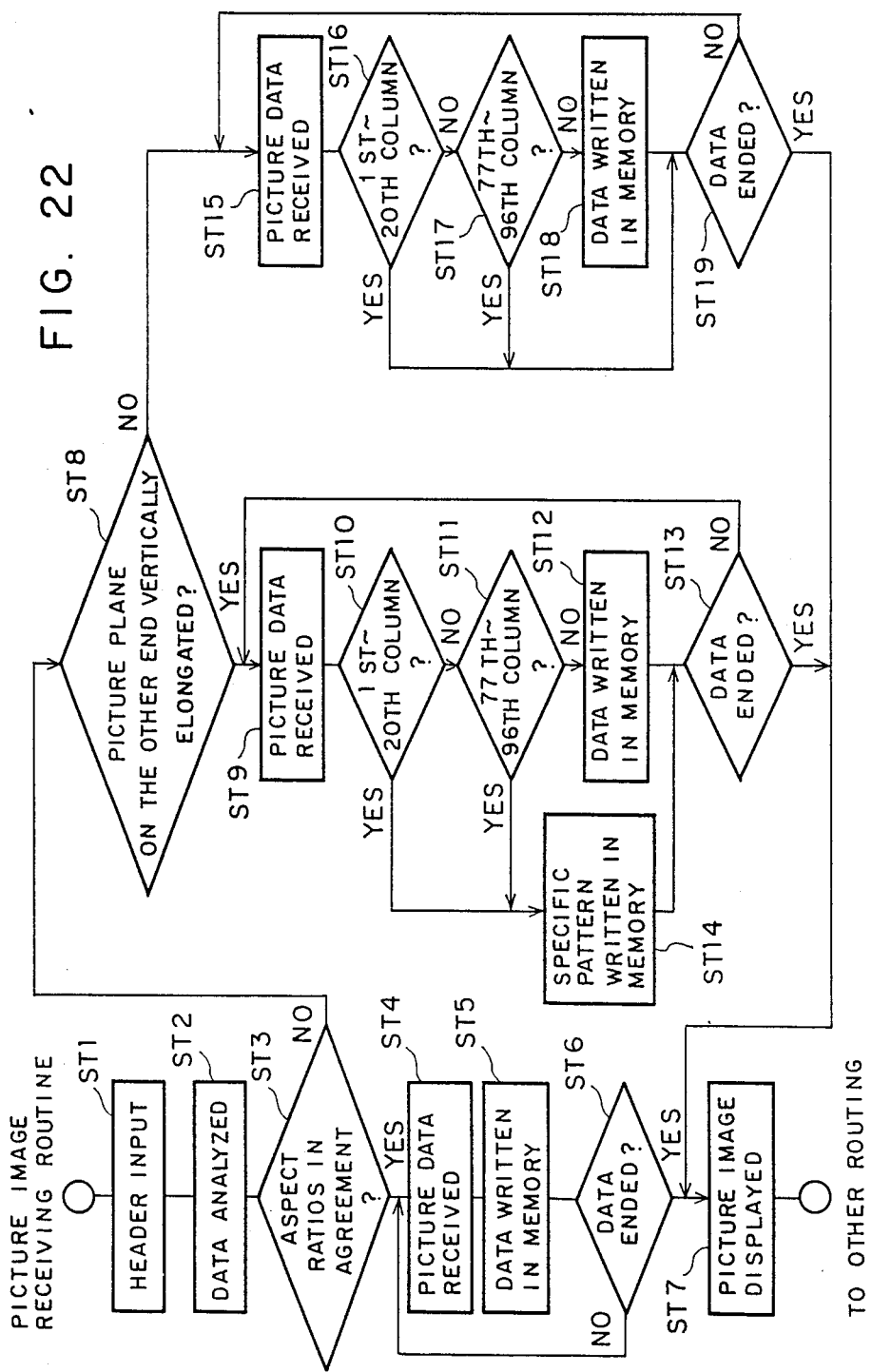
FIG. 22 is a flow chart showing an example to delete a portion of picture data in the case of transmission of a signal with a different aspect ratio of picture plane.

FIG. 22 is a flow chart describing in a concrete manner the processes performed in deleting both sides of the picture data.

Figure 20:
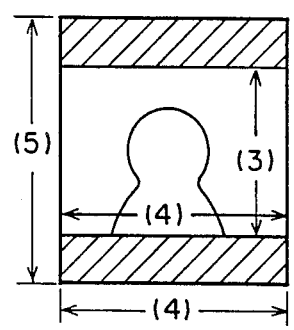
FIG. 20 is an explanatory diagram showing picture data processing to which another embodiment is applied.

Also a specific pattern may be added to received oblong picture data as shown in FIG. 20 to convert the data into picture data adapted for its own picture plane thereby to obtain a proper display.

For example, in the case similar to the above where the number of pixels of the picture plane of an apparatus is 96×96 and its aspect ratio is 5 High:4 Wide as shown in FIG. 18 and its received picture data has 96×96 pixels and an aspect ratio of 3 High:4 Wide as shown in FIG. 19, the CPU 11 compresses the 96-line picture data to the 58-line data. For compensating for 19 lines in each of the upper and lower picture data, it adds specific patterns in white, black, or the like. Thereby, the picture image displayed on the display 17 becomes similar to that displayed on the picture plane on the transmitter side. Thus, also by the method used in this example, picture data of a different aspect ratio can be received.

Figure 23:
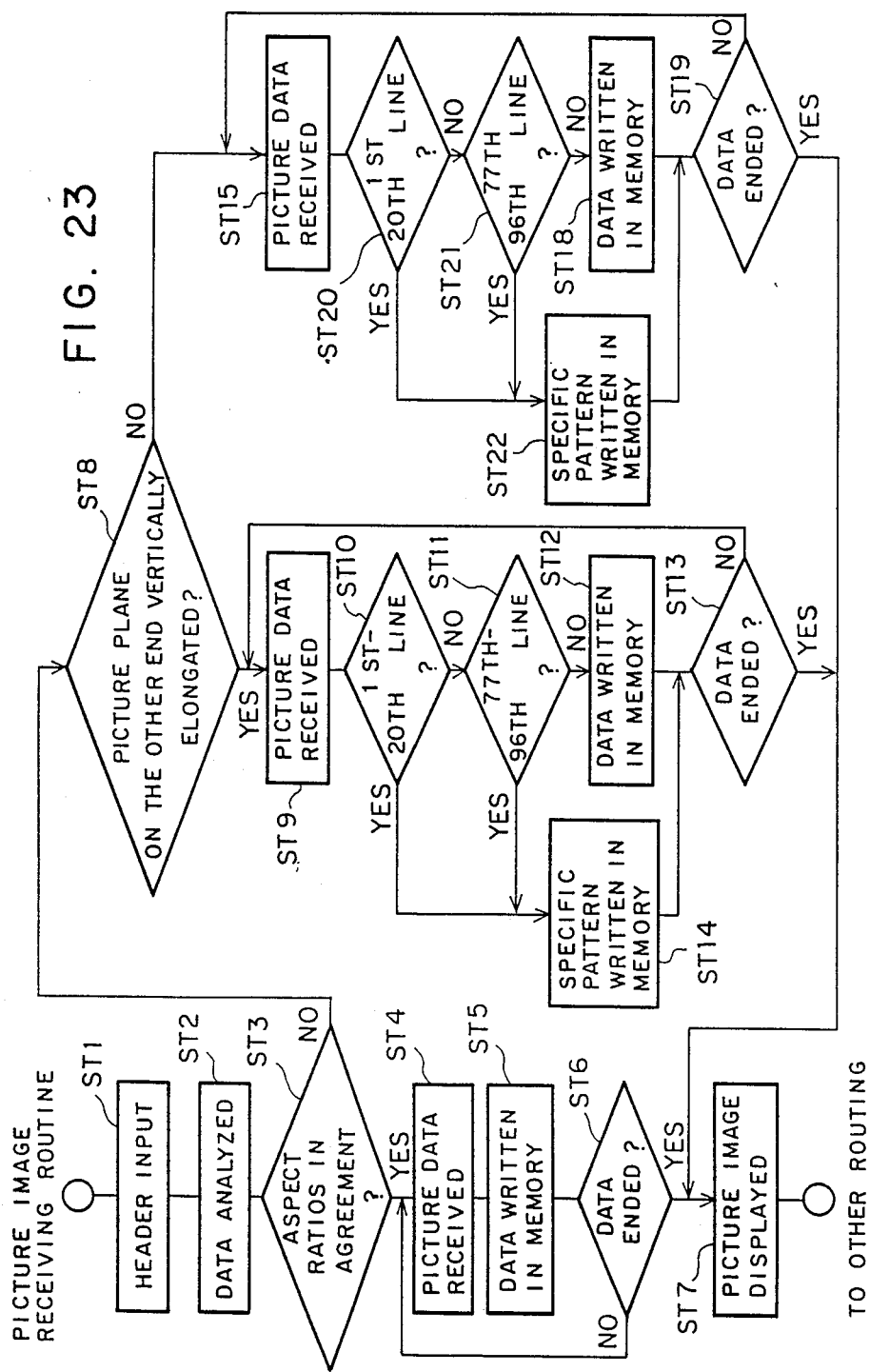
FIG. 23 is a flow chart showing an example to add partial picture data in similar case to the above example.

FIG. 23 is a flow chart describing in a concrete manner the processes performed in adding picture data as described above.

Conversion between picture data of different aspect ratios is also possible by other methods than those used in the above examples. It is further practicable to provide both the means to delete data and the means to add specific patterns as described above and to arrange these means such that either of these treatments is selectable by operating the key pad 9 or the like, or the treatments may be given in combination.

According to the method for still picture transmission according to the present invention as described above, communication between still picture video telephone apparatuses of different aspect ratios can be performed smoothly.

What is claimed is:

1. A still picture video telephone apparatus adapted to transmit and to receive, through a telephone line, still picture information delivered from a television camera or the like during a telephone call, comprising:

a picture memory for storing a plurality of pages of picture information consisting of a camera-taken picture memory portion which writes still picture information input thereto from said television camera at intervals of a predetermined period, a self-prepared picture memory portion which stores desired still picture information from said camera-taken picture memory portion, and an incoming picture memory portion storing a plurality of pages of incoming picture information in respective storage regions and which sequentially rewrites still picture information therein upon receipt of still picture information when said storage regions are full;

memory region information input means for setting up regions of said self-prepared picture memory portion and said incoming picture memory portion within said picture memory; and picture memory control means for controlling still picture information input to and output from said picture memory;

wherein said picture memory is capable of storing a plurality of pages of still picture information, and allocation of memory regions within the picture memory for said self-prepared picture memory portion and said incoming picture memory portion is variable.

2. The still picture video telephone apparatus according to claim 1, wherein said self-prepared picture memory portion is a memory for receiving desired still picture information transferred from said camera-taken picture memory portion and storing said desired still picture information as a picture image to be transmitted.

3. The still picture video telephone apparatus according to claim 1, wherein said self-prepared picture memory portion and incoming picture memory portion are each a memory capable of storing a plurality of pages of still picture information.

4. The still picture video telephone apparatus according to claim 1, further comprising a detector circuit for detecting a loop-off which indicates the end of a call, wherein said picture memory control means erases the picture information in said incoming picture memory portion in response to a loop-off detected signal from said detector circuit.

5. The still picture video telephone apparatus according to claim 4, wherein said detector circuit detects on/off of a power supply and said picture memory control means erases picture information in said incoming picture memory portion in response to a detected signal therefrom.

6. A method for transmitting still picture images for use in a still picture video telephone, comprising the steps of:
generating still picture information with a television camera or the like;
writing said still picture information into a picture memory for storage at one specific region thereof;
reading the stored still picture information from said picture memory and displaying a still picture image represented by said still picture information on a display;
extracting and transferring a preset desired portion of said stored still picture information to a second specific region of said picture memory;
reading the stored still picture information from said second specific region of said picture memory; and
converting the read information from said second specific region into a transmission signal and transmitting said transmission signal through a communication line to a receiving still picture video telephone system.

7. The method for transmitting still picture image for use in a still picture image for use in a still picture video telephone apparatus according to claim 6, wherein said desired portion of the still picture information is preset to be displayed in the full screen size of the display picture plane of the system on the other end of the line.

8. A method for displaying still picture images for use in a still picture video telephone apparatus whereby incoming still picture information through a communication line is stored in a picture memory and a picture image is displayed based on said stored incoming still picture information, comprising the steps of:
recognizing the resolution of incoming still picture information based on header data received prior to reception of the still picture information;
storing the received incoming still picture information into a special signal reception region of said picture memory sequentially;
displaying on a display the still picture information stored in said special signal reception region in accordance with the recognized resolution of said incoming still picture information during reception of incoming still picture information;
transferring said incoming still picture information stored in said special signal reception region to an ordinary picture memory used for displaying a still picture image on a display at the time of the normal operation; and
erasing the information stored in said special reception region after the end of signal reception such that when still picture information of a different resolution is received, a still picture image is displayed on a display in accordance with a predetermined resolution during signal reception.

9. A method for displaying still picture images for use in a still picture video telephone apparatus whereby desired a still picture is transmitted and received through a communication line and displayed during a telephone call, comprising the steps of:
inserting data representing the aspect ratio of the picture image into a header of the still picture information to be transmitted and received; and
upon receipt of still picture information with a larger aspect ratio than that of its own picture display plane, erasing the picture image data thereof corresponding to at least a portion of the peripheral region in the horizontal direction of its own picture plane.

10. A method for displaying still picture images for use in a still picture video telephone apparatus whereby a desired still picture is transmitted and received through a communication line and displayed during a telephone call, comprising the steps of:
inserting data representing the aspect ratio of the picture image in a header of the still picture information to be transmitted and received; and
adding, upon receipt of still picture information with a different aspect ratio, picture data on a specific pattern stored in advance of at least a portion of the peripheral region of its own picture plane.

* * * * *